(12) United States Patent
Grier et al.

(10) Patent No.: US 11,085,864 B2
(45) Date of Patent: Aug. 10, 2021

(54) COLLOIDAL FINGERPRINTS FOR SOFT MATERIALS USING TOTAL HOLOGRAPHIC CHARACTERIZATION

(71) Applicant: NEW YORK UNIVERSITY, New York, NY (US)

(72) Inventors: David G. Grier, New York, NY (US); David B. Ruffner, New York, NY (US); Aaron Yevick, New York, NY (US); Mark Hannel, New York, NY (US)

(73) Assignee: NEW YORK UNIVERSITY, New York, NY (US)

( * ) Notice: Subject to any disclaimer, the term of this patent is extended or adjusted under 35 U.S.C. 154(b) by 399 days.

(21) Appl. No.: 15/526,287

(22) PCT Filed: Nov. 11, 2015

(86) PCT No.: PCT/US2015/060183
§ 371 (c)(1),
(2) Date: May 11, 2017

(87) PCT Pub. No.: WO2016/077472
PCT Pub. Date: May 19, 2016

(65) Prior Publication Data
US 2017/0307497 A1    Oct. 26, 2017

Related U.S. Application Data

(60) Provisional application No. 62/078,639, filed on Nov. 12, 2014.

(51) Int. Cl.
*G01N 15/02* (2006.01)
*G03H 1/00* (2006.01)
(Continued)

(52) U.S. Cl.
CPC ....... *G01N 15/0227* (2013.01); *G03H 1/0005* (2013.01); *G03H 1/0443* (2013.01);
(Continued)

(58) Field of Classification Search
CPC .................................................. G01N 15/0227
(Continued)

(56) References Cited

U.S. PATENT DOCUMENTS 3,069,654 A   12/1962  Hough
4,532,422 A    7/1985  Nomura et al.
(Continued)

FOREIGN PATENT DOCUMENTS

CA    1159674 A1   1/1984
EP    0 354 37 A1  9/1981
(Continued)

OTHER PUBLICATIONS

Extended European Search Report in EP 15858793.1, dated Jul. 11, 2018, 10 pages.
(Continued)

*Primary Examiner* — Tarifur R Chowdhury
*Assistant Examiner* — Omar H Nixon
(74) *Attorney, Agent, or Firm* — Foley & Lardner LLP

(57) ABSTRACT

Systems and methods for uniquely identifying fluid-phase products by endowing them with fingerprints composed of dispersed colloidal particles, and by reading out those fingerprints on demand using Total Holographic Characterization. A library of chemically inert colloidal particles is developed that can be dispersed into soft materials, the stoichiometry of the mixture encoding user-specified information, including information about the host material. Encoded information then can be recovered by high-speed analysis of holographic microscopy images of the dispersed particles. Specifically, holograms of individual colloidal (Continued)

spheres are analyzed with predictions of the theory of light scattering to measure each sphere's radius and refractive index, thereby building up the distribution of particle properties one particle at a time. A complete analysis of a colloidal fingerprint requires several thousand single-particle holograms and can be completed in ten minutes.

18 Claims, 4 Drawing Sheets

(51) Int. Cl.
    *G03H 1/04*           (2006.01)
    *G06K 9/00*           (2006.01)
    *G06K 9/20*           (2006.01)
    *G01N 15/00*          (2006.01)
    *G01N 21/47*          (2006.01)
    *B01L 3/00*           (2006.01)

(52) U.S. Cl.
    CPC ..... *G06K 9/00127* (2013.01); *G06K 9/00577* (2013.01); *G06K 9/2018* (2013.01); *B01L 3/5027* (2013.01); *G01N 2015/0053* (2013.01); *G01N 2015/0233* (2013.01); *G01N 2015/03* (2013.01); *G01N 2021/4707* (2013.01); *G03H 2001/005* (2013.01); *G03H 2001/0033* (2013.01); *G03H 2001/0447* (2013.01)

(58) Field of Classification Search
    USPC ......................................................... 356/335
    See application file for complete search history.

(56) References Cited

U.S. PATENT DOCUMENTS

| | | | |
|---|---|---|---|
| 4,627,729 | A | 12/1986 | Breuckmann et al. |
| 4,740,079 | A | 4/1988 | Koizumi et al. |
| 4,986,659 | A | 1/1991 | Bachalo |
| 4,998,788 | A | 3/1991 | Osakabe et al. |
| 5,095,207 | A | 3/1992 | Tong |
| 5,796,498 | A | 8/1998 | French |
| 5,880,841 | A | 3/1999 | Marron et al. |
| 6,097,488 | A | 8/2000 | Grek et al. |
| 6,214,560 | B1 | 4/2001 | Yguerabide et al. |
| 6,281,994 | B1 | 8/2001 | Horikoshi et al. |
| 6,480,285 | B1 | 11/2002 | Hill |
| 6,519,033 | B1 | 2/2003 | Quist et al. |
| 6,710,874 | B2 | 3/2004 | Mavliev |
| 7,001,721 | B1 | 2/2006 | Whitcombe et al. |
| 7,218,112 | B2 | 5/2007 | Ladebeck et al. |
| 7,248,282 | B2 | 7/2007 | Maddison |
| 7,338,168 | B2 | 3/2008 | Cartlidge et al. |
| 7,532,327 | B2 | 5/2009 | Bloom et al. |
| 7,839,551 | B2 | 11/2010 | Lee et al. |
| 8,119,988 | B2 | 2/2012 | Daido et al. |
| 8,299,789 | B2 | 10/2012 | Heid et al. |
| 8,331,019 | B2 | 12/2012 | Cheong et al. |
| 8,405,395 | B2 | 3/2013 | Setsompop et al. |
| 8,431,884 | B2 | 4/2013 | Grier |
| 8,680,861 | B1 | 3/2014 | Morrone |
| 8,766,169 | B2 | 7/2014 | Grier et al. |
| 8,791,985 | B2 | 7/2014 | Grier et al. |
| 9,316,578 | B2 | 4/2016 | Grier et al. |
| 9,897,675 | B2 | 2/2018 | Setsompop et al. |
| 9,933,351 | B2 | 4/2018 | Kent et al. |
| 2002/0069242 | A1 | 6/2002 | Berns |
| 2003/0021382 | A1 | 1/2003 | Iwanczyk et al. |
| 2004/0004716 | A1 | 1/2004 | Mavliev |
| 2004/0004717 | A1 | 1/2004 | Reed |
| 2004/0072372 | A1 | 4/2004 | Seul et al. |
| 2005/0141757 | A1 | 6/2005 | Ayache et al. |
| 2006/0127369 | A1* | 6/2006 | Christensen ......... B01J 19/0046 424/93.7 |
| 2007/0070303 | A1 | 3/2007 | Yonekubo |
| 2007/0242269 | A1 | 10/2007 | Trainer |
| 2008/0037004 | A1 | 2/2008 | Shamir et al. |
| 2008/0150532 | A1 | 6/2008 | Slavin et al. |
| 2009/0059008 | A1 | 3/2009 | Ishii |
| 2009/0128825 | A1* | 5/2009 | Akcakir ................ G01B 9/021 356/457 |
| 2010/0090694 | A1 | 4/2010 | Heid et al. |
| 2010/0259263 | A1 | 10/2010 | Holland et al. |
| 2011/0043607 | A1 | 2/2011 | Grier et al. |
| 2011/0130348 | A1* | 6/2011 | Ting ..................... C07K 7/06 514/21.5 |
| 2011/0157599 | A1 | 6/2011 | Weaver et al. |
| 2011/0292363 | A1 | 12/2011 | Ivey et al. |
| 2012/0135535 | A1 | 5/2012 | Grier et al. |
| 2012/0177543 | A1 | 7/2012 | Battrell et al. |
| 2012/0235678 | A1 | 9/2012 | Seiberlich et al. |
| 2012/0256626 | A1 | 10/2012 | Adalsteinsson et al. |
| 2012/0273664 | A1 | 11/2012 | Grier et al. |
| 2013/0038326 | A1 | 2/2013 | Amadon et al. |
| 2013/0271135 | A1 | 10/2013 | Ozen et al. |
| 2013/0278743 | A1 | 10/2013 | Cheong et al. |
| 2013/0308135 | A1 | 11/2013 | Dubois et al. |
| 2014/0170735 | A1* | 6/2014 | Holmes ................ G01N 21/07 435/287.1 |
| 2014/0177932 | A1 | 6/2014 | Milne et al. |
| 2014/0253126 | A1 | 9/2014 | Habara et al. |
| 2014/0313510 | A1 | 10/2014 | Schmidt et al. |
| 2014/0333935 | A1 | 11/2014 | Grier et al. |
| 2015/0002150 | A1 | 1/2015 | Weissler et al. |
| 2015/0062587 | A1 | 3/2015 | Shpaisman et al. |
| 2015/0300963 | A1 | 10/2015 | Haidekker et al. |
| 2015/0301141 | A1 | 10/2015 | Griswold et al. |
| 2015/0346300 | A1 | 12/2015 | Setsompop et al. |
| 2016/0116559 | A1 | 4/2016 | Cohen |
| 2016/0282436 | A1 | 9/2016 | Cloos |
| 2016/0291105 | A1 | 10/2016 | Knoll et al. |
| 2016/0291107 | A1 | 10/2016 | Rosen et al. |
| 2019/0033414 | A1 | 1/2019 | Sofka et al. |
| 2019/0033415 | A1 | 1/2019 | Sofka et al. |

FOREIGN PATENT DOCUMENTS

| | | |
|---|---|---|
| EP | 0 278 714 A2 | 8/1988 |
| EP | 1 855 081 A1 | 11/2007 |
| EP | 1 865 430 A2 | 12/2007 |
| JP | 55-096976 A | 7/1980 |
| JP | 03-251388 A | 11/1991 |
| JP | 03-251888 A | 11/1991 |
| JP | 2000-225302 A | 8/2000 |
| JP | 2001-034148 A | 2/2001 |
| JP | 2007-279475 A | 10/2007 |
| JP | 2011-525967 A | 9/2011 |
| JP | 2014-503794 A | 2/2014 |
| WO | WO-03/048868 A1 | 6/2003 |
| WO | WO-2005/027031 A2 | 3/2005 |
| WO | WO-2006/034129 A2 | 3/2006 |
| WO | WO-2008/127410 A2 | 10/2008 |
| WO | WO-2013/080164 A1 | 6/2013 |
| WO | 2013/126554 A1 | 8/2013 |

OTHER PUBLICATIONS

U.S. Food and Drug Administration, "Guidance for Industry—Immunogenicity Assessment for Therapeutic Protein Products", Aug. 2014, 39 pages.

Aspnes, D.E., "Local-field effects and effective-medium theory: A microscopic perspective", Am. J. Phys., Aug. 1982, 50(8):704-709.

Atherton, T.J., et al., "Size invariant circle detection", Image and Vision Computing, 1999, 17(11):795-803.

Ball, V., et al., "Complexation Mechanism of Bovine Serum Albumin and Poly(allylamine hydrochloride)", J. Phys. Chem. B, 2002, 106(9):2357-2364.

Ballard, D.H., "Generalizing the Hough Transform to Detect Arbitrary Shapes", Pattern Recognition, 1981, 13(2):111-122.

(56) References Cited

OTHER PUBLICATIONS

Basim, G.B., et al., "Effect of Soft Agglomerates on CMP Slurry Performance", Journal of Colloid and Interface Science, 2002, 256(1):137-142.
Basim, G.B., et al., "Effect of Particle Size of Chemical Mechanical Polishing Slurries for Enhanced Polishing with Minimal Defects", Journal of the Electrochemical Society, 2000, 147(9):3523-3528.
Ben-Eliezer, N., et al., "A New Model-Based Technique for Accurate Reconstruction of T2 Relaxation Maps from Fast Spin-Echo Data", Proc. Intl. Soc. Mag. Reson. Med., 2013, 21:2453.
Bishop, C.M., "Inverse problems", in Neural Networks for Pattern Recognition, 1995, p. 207, Clarendon Press, Oxford.
Boas, D.A., et al., "Scattering of diffuse photon density waves by spherical inhomogeneities within turbid media: Analytic solution and applications", Proc. Natl. Acad. Sci., May 1994, 91(11):4887-4891.
Bohren, C.F., et al., Absorption and Scattering of Light by Small Particles, 1983, 12 pages, Wiley-VCH Verlag GmbH & Co., KGaA, Weinheim.
Bolognesi, G., et al., "Digital holographic tracking of microprobes for multipoint viscosity measurements", Optics Express, Sep. 26, 2011, 19(20):19245-19254.
Bourquard, A., et al., "A practical inverse-problem approach to digital holographic reconstruction", Optics Express, Feb. 11, 2013, 21(3):3417-3433.
Carpenter, J.F., et al., "Overlooking Subvisible Particles in Therapeutic Protein Products: Gaps That May Compromise Product Quality", Journal of Pharmaceutical Sciences, Apr. 2009, 98(4):1201-1205.
Chang, C-C., et al., "LIBSVM: A Library for Support Vector Machines", ACM Transactions on Intelligent Systems and Technology, 2011, 2(3), 27 pages.
Chang, C-C., et al., "Training v-Support Vector Regression: Theory and Algorithms", Neural Computation, 2002, 14(8):1959-1977.
Chen, Y., et al., "Magnetic resonance fingerprinting (MRF) for rapid quantitative abdominal imaging", Proc. Intl. Soc. Mag. Reson. Med., 2014, 22:561.
Cheong, F.C., et al., "Rotational and translational diffusion of copper oxide nanorods measured with holographic video microscopy", Optics Express, Mar. 29, 2010, 18(7):6555-6562.
Cheong, et al., "Flow visualization and flow cytometry with holographic video microscopy," Optics Express, 2009, 17(15):13071-13079.
Cheong, F.C., et al., "Holographic characterization of individual colloidal spheres' porosities", Soft Matter, 2011, 7(15):6816-6819.
Cheong, F.C., et al., "Holographic microrheology of polysaccharides from Streptococcus mutans biofilms", Rheologica Acta, 2009, 48(1):109-115.
Cheong, F.C., et al., "Strategies for three-dimensional particle tracking with holographic video microscopy", Optics Express, 2010, 18(13):13563-13573.
Cheong, F.C., et al., "Technical note: Characterizing individual milk fat globules with holographic video microscopy", J. Dairy Sci., 2009, 92(1):95-99.
Chia, V.K.F., et al., "A Review of Analytical Techniques for Identifying Contaminants in the Semiconductor Industry", Journal of the IEST, 2002, 45(1):37-44.
Cloos, M.A., et al., "Plug and Play Parallel Transmission at 7 and 9.4 Tesla Based on Principles from MR Fingerprinting", Proc. Intl. Soc. Mag. Reson. Med., 2014, 22:0542.
Colomb, et al., "Polarization microscopy by use of digital holography: application to optical-fiber birefringence measurements," Applied Optics, 2005, 44(21):4461-4469.
Costantino, H.R., et al., "Moisture-Induced Aggregation of Lyophilized Insulin", Pharmaceutical Research, 1994, 11(1):21-29.
Crocker, J.C., et al., "Methods of Digital Video Microscopy for Colloidal Studies", Journal of Colloid and Interface Science, 1996, 179(1):298-310.

Demeule, B., et al., "Characterization of Particles in Protein Solutions: Reaching the Limits of Current Technologies", The AAPS Journal, Dec. 2010, 12(4):708-715.
Den Engelsman, J., et al., "Strategies for the Assessment of Protein Aggregates in Pharmaceutical Biotech Product Development", Pharm Res, 2011, 28(4):920-933.
Denis, et al., "Direct Extraction of the Mean Particle Size from a Digital Hologram," Applied Optics, 2006, 45(5):944-952.
Dixon, L., et al., "Holographic deconvolution microscopy for high-resolution particle tracking", Optics Express, Aug. 15, 2011, 19(17):16410-16417.
Dixon, L., et al., "Holographic particle-streak velocimetry", Optics Express, Feb. 28, 2011, 19(5): 4393-4398.
Doneva, M., et al., "Compressed Sensing Reconstruction for Magnetic Resonance Parameter Mapping", Magnetic Resonance in Medicine, 2010, 64:1114-1120.
Dumm, T.F., "Characterization of Low-Level, Oversize Particles in Abrasive Powders," KONA Powder and Particle Journal, 2005, 23:129-138.
Feder, J., et al,. "Scaling Behavior and Cluster Fractal Dimension Determined by Light Scattering from Aggregating Proteins", Physical Review Letters, Oct. 8, 1984, 53(15):1403-1406.
Filipe, V., et al., "Critical Evaluation of Nanoparticle Tracking Analysis (NTA) by NanoSight for the Measurement of Nanoparticles and Protein Aggregates", Pharmaceutical Research, May 2010, 27(5):796-810.
Fung, J., et al., "Holographic measurements of anisotropic three-dimensional diffusion of colloidal clusters", Physical Review E, 2013, 88:020302-1-5.
Fung, J., et al., "Imaging Multiple Colloidal Particles by Fitting Electromagnetic Scattering Solutions to Digital Holograms", Journal of Quantitative Spectroscopy and Radiative Transfer, 2012, 113(18):2482-2489.
Fung, J., et al., "Measuring translational, rotational, and vibrational dynamics in colloids with digital holographic microscopy", Optics Express, Apr. 25, 2011, 19(9):8051-8065.
Goller, M.I., et al., "Inorganic "silicone oil" microgels", Colloids and Surfaces A: Physicochemical and Engineering Aspects, 1997, 123-124:183-193.
Goodman, J.W., "Statistical Properties of Laser Speckle Patterns", in Laser Speckle and Related Phenomena, Topics in Applied Physics, Dainty, J.C., ed., 2007, pp. 9-75, Springer, Berlin, Heidelberg.
Graesslin, I., et al., "Fully Integrated Whole Body 3T MRI System for Parallel RF Transmission", Proc. Intl. Soc. Mag. Reson. Med., 2007, 15:1007.
Graesslin, I., et al., "Whole Body 3T MRI System with Eight Parallel RF Transmission Channels", Proc. Intl. Soc. Mag. Reson. Med., 2006, 14:129.
Grier, D.G., "A Revolution in Optical Manipulation", Nature, 2003, 424:810-816.
Grier, D., "Downloadable holographic microscopy software written in IDL, the Interactive Data Language", <http://physics.nyu.edu/grierlab/software.html>, 2014, 3 pages.
Hagiwara, T., et al., "Fractal Analysis of Aggregates Formed by Heating Dilute BSA Solutions Using Light Scattering Methods", Biosci. Biotech. Biochem., 1996, 60(11):1757-1763.
Haist, T., et al., "Using Graphics Boards to Compute Holograms", Computing in Science & Engineering, Jan./Feb. 2006, 8:8-13.
Hannel, M., et al., "Holographic characterization of imperfect colloidal spheres", Applied Physics Letters, 2015, 107(14):141905, 4 pages.
Hillman, T.R., et al., "Microscopic particle discrimination using spatially-resolved Fourier-holographic light scattering angular spectroscopy", Optics Express, Nov. 13, 2006, 14(23):11088-11102.
Hogg, R., "Issues in Particle Size Analysis", KONA Powder and Particle Journal, 2008, 26:81-93.
Hollitt, C., "A convolution approach to the circle Hough transform for arbitrary radius", Machine Vision and Applications, 2013, 24(4):683-694.
Holm, N. K., et al., "Aggregation and fibrillation of bovine serum albumin," Biochimica et Biophysica Acta (BBA)—Proteins and Proteomics, 2007, 1774(9):1128-1138.

(56) References Cited

OTHER PUBLICATIONS

Hukkanen, E.J., et al., "Measurement of particle size distribution in suspension polymerization using in situ laser backscattering", Sensors and Actuators B: Chemical, 2003, 96(1-2):451-459.

Ishimaru, A., "Diffusion of light in turbid material", Applied Optics, Jun. 15, 1989, 28(12):2210-2215.

Jones, L.S., et al., "Silicone Oil Induced Aggregation of Proteins", Journal of Pharmaceutical Sciences, Apr. 2005, 94(4):918-927.

Kao, H.P., et al., "Tracking of Single Fluorescent Particles in Three Dimensions: Use of Cylindrical Optics to Encode Particle Position", Biophysical Journal, Sep. 1994, 67(3):1291-1300.

Katscher, U., et al., "Parallel RF transmission in MRI", NMR Biomed., 2006,19(3):393-400.

Katscher, U., et al., "RF Encoding Using a Multielement Parallel Transmit System", Magnetic Resonance in Medicine, 2010, 63(6):1463-1470.

Knoll, F., et al., "Simultaneous MR-PET Reconstruction Using Multi Sensor Compressed Sensing and Joint Sparsity", Proc. Intl. Soc. Mag. Reson. Med., 2014, 22:0082.

Kolomenkin, M., et al., "Geometric Voting Algorithm for Star Trackers", IEEE Transactions on Aerospace and Electronic Systems, Apr. 2008, 44(2):441-456.

Kosters, T., et al., "EMRECON: An Expectation Maximization Based Image Reconstruction Framework for Emission Tomography Data", 2011, IEEE Nuclear Science Symposium Conference Record, pp. 4365-4368.

Krishnatreya, B.J., et al., "Fast feature identification for holographic tracking: the orientation alignment transform", Optics Express, Jun. 2, 2014, 22(11):12773-12778.

Krishnatreya, B.J., et al., "Measuring Boltzmann's constant through holographic video microscopy of a single colloidal sphere", American Journal of Physics, 2014, 82:23-31.

Lee, S-H., et al., "Holographic microscopy of holographically trapped three-dimensional structures", Optics Express, Feb. 19, 2007, 15(4):1505-1512.

Lee, S-H., et al., "Characterizing and tracking single colloidal particles with video holographic microscopy", Optics Express, Dec. 24, 2007, 15(26):18275-18282.

Lee, M.H., et al., "Statistics of speckle propagation through the turbulent atmosphere," J. Opt. Soc. Am., Nov. 1976, 66(11):1164-1172.

Li, S., et al., "Understanding Stober Silica's Pore Characteristics Measured by Gas Adsorption", Langmuir, 2015, 31(2):824-832.

Ma, D., et al., "Magnetic resonance fingerprinting", Nature, Mar. 14, 2013, 495:187-193.

Malitson, I.H., "Interspecimen Comparison of the Refractive Index of Fused Silica", Journal of the Optical Society of America, 1965, 55(10):1205-1209.

Maret, G., et al., "Multiple Light Scattering from Disordered Media. The Effect of Brownian Motion of Scatterers", Z. Phys. B Condensed Matter, 1987, 65(4):409-413.

Maschke, A., et al., "Micronization of Insulin by High Pressure Homogenization", Pharmaceutical Research, Sep. 2006, 23(9):2220-2229.

Meakin, P., "Fractal Aggregates", Advances in Colloid and Interface Science, 1988, 28:249-331.

Moreno, D., et al., "Particle positioning from charge-coupled device images by the generalized Lorenz-Mie theory and comparison with experiment", Applied Optics, Oct. 1, 2000, 39(28):5117-5124.

Moyses, et al., "Robustness of Lorenz-Mie microscopy against defects in illumination," Optics Express 21(5), pp. 5968-5973 (2013).

Mueller, S.G., et al., "The Alzheimer's Disease Neuroimaging Initiative", Neuroimaging Clin N Am., Nov. 2005, 15(4):869-877.

Nebrensky, et al., "A Particle Imaging and Analysis System for Underwater Holograms," Optical Methods and Data Processing in Heat and Fluid Flow, pp. 79-92 (2002).

Nelles, et al., "Dual-Source Parallel RF Transmission for Clinical MR Imaging of the Spine at 3.0 T: Intraindividual Comparison with Conventional Single-Source Transmission," Radiology 257(3), pp. 743-753 (2010).

Obey, T.M., et al., "Novel Monodisperse "Silicone Oil"/Water Emulsions", Journal of Colloid and Interface Science, 1994, 163(2):454-463.

Omichi, et al., "Fabrication of enzyme-degradable and size-controlled protein nanowires using single particle nano-fabrication technique," Nature Communications 5, 3718, 8 pages (2014).

Orzada, et al., "Design and comparison of two eight-channel transmit/receive radiofrequency arrays for in vivo rodent imaging on a 7 T human whole-body MRI system," Medical Physics 37(5), pp. 2225-2232 (2010).

Pan, et al., "Three-Dimensional Particle Tracking for Dilute Particle-Liquid Flows in a Pipe," Measurement Science and Technology 13(8), pp. 1206-1216 (2002).

Panchal, et al., "Analyzing Subvisible Particles in Protein Drug Products: a Comparison of Dynamic Light Scattering (DLS) and Resonant Mass Measurement (RMM)," The AAPS Journal 16(3), pp. 440-451 (2014).

Parthasarathy, "Rapid, accurate particle tracking by calculation of radial symmetry centers," Nature Methods 9, pp. 724-726 (2012).

Pawashe, C., et al., "Two-dimensional vision-based autonomous microparticle manipulation using a nanoprobe", Journal of Micromechatronics, 2006, 3(3-4):285-306.

Pedregosa, et al., "Scikit-learn: Machine Learning in Python," Journal of Machine Learning Research 12, pp. 2825-2830 (2011).

Perry, et al., "Real-space studies of the structure and dynamics of self-assembled colloidal clusters," Faraday Discussions 159, pp. 211-234 (2012).

Pine, et al., "Diffusing wave spectroscopy," Physical Review Letters 60(12), pp. 1134-1137 (1988).

Quick, "Integrated PET/MR," Journal of Magnetic Resonance Imaging 39(2), pp. 243-258 (2014).

Rappaz, et al., "Erythrocytes volume and refractive index measurement with a digital holographic microscope," Proceedings vol. 6445: Optical Diagnostics and Sensing VII, 644509, 5 pages (2007).

Rappaz, et al., "Simultaneous cell morphometry and refractive index measurement with dual-wavelength digital holographic microscopy and dye-enhanced dispersion of perfusion medium," Optics Letters 33(7), pp. 744-746 (2008).

Remsen, et al., "Analysis of Large Particle Count in Fumed Silica Slurries and Its Correlation with Scratch Defects Generated by CMP," Journal of the Electrochemical Society 153(5), pp. G453-G461 (2006).

Ripple, D.C., et al., "Protein Particles: What We Know and What We Do Not Know", Journal of Pharmaceutical Sciences, 2012, 101(10):3568-3579.

Roichman, et al., "Influence of Nonconservative Optical Forces on the Dynamics of Optically Trapped Colloidal Spheres: The Fountain of Probability," Physical Review Letters 101, 128301, 5 pages (2008).

Rubinstein, et al., "Recognition of distorted patterns by invariance kernels," Pattern Recognition 24(10), pp. 959-967 (1991).

Savin, T., et al., "Role of a finite exposure time on measuring an elastic modulus using microrheology", Physical Review E, 2005, 71:041106, 6 pages.

Savin, T., et al., "Static and Dynamic Errors in Particle Tracking Microrheology", Biophysical Journal, Jan. 2005, 88(1):623-638.

Schellekens, "Bioequivalence and the immunogenicity of biopharmaceuticals," Nature Reviews Drug Discovery 1, pp. 457-462 (2002).

Sciammarella, C.A., et al., "Measuring Mechanical Properties of Materials in the Micron Range", Optical Engineering, May 2003, 42(5), 8 pages.

Seifi, et al., "Fast and accurate 3D object recognition directly from digital holograms," Journal of the Optical Society of America A 30(11), pp. 2216-2224 (2013).

Sheng, et al., "Digital holographic microscope for measuring three-dimensional particle distributions and motions," Applied Optics 45(16), pp. 3893-3901 (2006).

(56) References Cited

OTHER PUBLICATIONS

Shpaisman, et al., "Holographic microrefractometer," Applied Physics Letters 101, 091102, 3 pages (2012).
Singh, et al., "An industry perspective on the monitoring of subvisible particles as a quality attribute for protein therapeutics," Journal of Pharmaceutical Sciences 99(8), pp. 3302-3321 (2010).
Siposova, et al., "Depolymerization of insulin amyloid fibrils by albumin-modified magnetic fluid," Nanotechnology 23(5), 055101, 10 pages (2012).
Sluzky, et al., "Kinetics of insulin aggregation in aqueous solutions upon agitation in the presence of hydrophobic surfaces," Proceedings of the National Academy of Sciences 88(21), pp. 9377-9381 (1991).
Smola, A.J., et al., "A tutorial on support vector regression", Statistics and Computing, 2004, 14(3): 199-222.
Sorensen, "Light Scattering by Fractal Aggregates: A Review," Aerosol Science and Technology 35(2), pp. 648-687 (2001).
Strzodka, et al., "Real-Time Motion Estimation and Visualization on Graphics Cards," IEEE Visualization 2004, pp. 545-552 (2004).
Tolla, B., et al., "Distortion of Single-Particle Optical Sensing (SPOS) Particle Count by Sub-Countable Particles", Part. Part. Syst. Charact., 2010, 27(1-2):21-31.
Voros, et al., "The Density and Refractive Index of Adsorbing Protein Layers," Biophysical Journal 87(1), pp. 553-561 (2004).
Wang, "Protein aggregation and its inhibition in biopharmaceutics," International Journal of Pharmaceutics 289(1-2), pp. 1-30 (2005).
Wang, et al., "Celebrating Soft Matter's 10th Anniversary: Monitoring colloidal growth with holographic microscopy," Soft Matter 11(6), pp. 1062-1066 (2015).
Wang, et al., "Stimulus-responsive colloidal sensors with fast holographic readout," Applied Physics Letters 107(5), 051903, 5 pages (2015).
Wang, et al., "Using the discrete dipole approximation and holographic microscopy to measure rotational dynamics of non-spherical colloidal particles," Journal of Quantitative Spectroscopy and Radiative Transfer 146, pp. 499-509 (2014).
Weber, E., et al., "A Novel 8-Channel Transceive Volume-Array for a 9.4T Animal Scanner", Proc. Intl. Soc. Mag. Reson. Med., 2008, 16:151.
Weinbuch, et al., "Micro—Flow Imaging and Resonant Mass Measurement (Archimedes)—Complementary Methods to Quantitatively Differentiate Protein Particles and Silicone Oil Droplets," Journal of Pharmaceutical Sciences 102(7), pp. 2152-2165 (2013).
Witten Jr., T.A., et al., "Diffusion-Limited Aggregation, a Kinetic Critical Phenomenon," Physical Review Letters, Nov. 9, 1981, 47(19):1400-1403.
Wu, S-H., et al., "Synthesis of mesoporous silica nanoparticles," Chem. Soc. Rev., May 7, 2013, 42(9):3862-3875.
Xiao, K., et al., "Multidimensional optical fractionation with holographic verification", Physical Review Letters 104, 2010, 028302, 4 pages.
Yang, et al., "Spatial coherence of forward-scattered light in a turbid medium," Journal of the Optical Society of America A 16(4), pp. 866-871 (1999).
Ye, H., et al., "Accelerating Magnetic Resonance Fingerprinting (MRF) Using t-Blipped Simultaneous Multislice (SMS) Acquisition", Magnetic Resonance in Medicine, 2016, 75(5):2078-2085.
Yevick, A., et al., "Machine-learning approach to holographic particle characterization", Optics Express, Nov. 3, 2014, 22(22):26884-26890.
Yip, C.M., et al., "Atomic Force Microscopy of Crystalline Insulins: The Influence of Sequence Variation on Crystallization and Interfacial Structure", Biophysical Journal, May 1998, 74(5):2199-2209.
Yip, C.M., et al., "Structural and Morphological Characterization of Ultralente Insulin Crystals by Atomic Force Microscopy: Evidence of Hydrophobically Driven Assembly", Biophysical Journal, Sep. 1998, 75(3):1172-1179.
Zolls, S., et al., "How Subvisible Particles Become Invisible—Relevance of the Refractive Index for Protein Particle Analysis", Journal of Pharmaceutical Sciences, May 2013, 102(5):1434-1446.
International Search Report and Written Opinion for PCT/US2017/048496, dated Nov. 9, 2017, 10 pages.

\* cited by examiner

COLLOIDAL FINGERPRINTS FOR SOFT MATERIALS USING TOTAL HOLOGRAPHIC CHARACTERIZATION

CROSS-REFERENCE TO RELATED APPLICATIONS

This application claims the benefit of U.S. Provisional Application No. 62/078,639 filed on Nov. 12, 2014, which is hereby incorporated by reference in its entirety.

BACKGROUND OF THE INVENTION

The market for methods to fingerprint foods and consumer products is growing at an annual rate of 16% and is accelerating in response to the estimated $15 billion cost of food fraud alone. Food fraud being difficult to detect, the actual cost in terms of lost revenue to companies and lost value to consumers may be several times higher.

A real-world example is provided by dairy processing at Nestle'. One manufacturing site alone performs 2,000 analyses of milk and milk products every day in an effort to verify the products' points of origin. Most of these measurements are based on conventional spectroscopic techniques including FTIR and NMR. Performing multiple tests to characterize each sample is time-consuming and costly. Were milk samples labeled with colloidal fingerprints at the source, identifying point of origin could be achieved in a matter of minutes with a single measurement. Substituting inferior milk for premium dairy products early in the supply chain has become a lucrative revenue source for organized crime. Colloidal fingerprinting has the potential to substantially reduce the economic, health and safety costs of supply-chain tampering.

Despite great steps taken to prevent drug counterfeiting, the pharmaceutical industry experienced a loss of $514 billion in 2012 due to counterfeiting, primarily in over-the-counter products. Luxury products such as perfume, wine and spirits are another target of counterfeiting because of their potential for large profit margins. Wine Spectator magazine speculates that as much as 20% of the wine on the global market today may be counterfeit. Milk is one of the most defrauded products worldwide. The low cost of milk and the difficulty in detecting adulteration makes milk a particular challenge for counterfeit detection. The largest segment of the market for milk is our most vulnerable, infants and children. The need for a cost-effective and versatile method of fingerprinting milk is a global unmet need.

Anti-counterfeiting measures for fluid products have focused on secure and traceable packaging or on chemical analysis of a statistical sample of the product. Major corporations, such as Alien Technology and 3M Company, have pursued the former strategy by adding high tech labeling, coatings or additives to packages that are difficult to duplicate. These measures help to ensure the integrity of the package. Further incorporating anti-tampering technologies helps to ensure that the package actually contains the advertised product. Such measures, however, tend to be costly, and still can be circumvented by determined counterfeiters. The expense associated with chemical analysis does not allow for comprehensive verification of every package, particularly not for commodity products such as milk. Exhaustive analysis of a statistical sample of products, however, has brought to light many of the known cases of product fraud. Many more are assumed to remain undetected.

Adulteration of consumer products and food costs the U.S. economy more than $15 billion a year. A single incident of product fraud costs between 2 to 15 percent of a company's revenue for that product. The FDA is working to increase the safety of the national food supply through new regulations, but is limited by the availability of methods to detect fraud, adulteration and counterfeiting.

SUMMARY OF THE INVENTION

Certain embodiments relate to systems, methods, and compositions regarding colloidal fingerprinting. Specifically, systems, methods, and compositions relating to identifying colloidal fingerprints using holographic microscopy. One embodiment relates to determining associated properties of a fluid based upon the colloidal finger print determine a colloidal fingerprint of a colloid associated with a fluid, matching the determined colloidal fingerprint to an associated colloid; and determining at least one property of the fluid based on the associated colloid.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 2A shows an example of a holographic video microscope setup. FIG. 2B illustrates laser light scattered by a particle in a microfluidic channel interferes with the unscattered portion of the beam to form a hologram that is magnified by a conventional optical microscope before being recorded by a video camera. In-line holograms of individual colloidal spheres are interpreted with the Lorenz-Mie theory of light scattering to obtain individual particles' radii, $a_p$, and refractive indexes, $n_p$. Each plot symbol represents the properties of a single sphere taken from a commercial sample of monodisperse polystyrene particles. One embodiment of a benchtop instrument, shown schematically at right, is optimized for fast colloidal characterization.

DETAILED DESCRIPTION OF THE PREFERRED EMBODIMENTS

Figure 1:
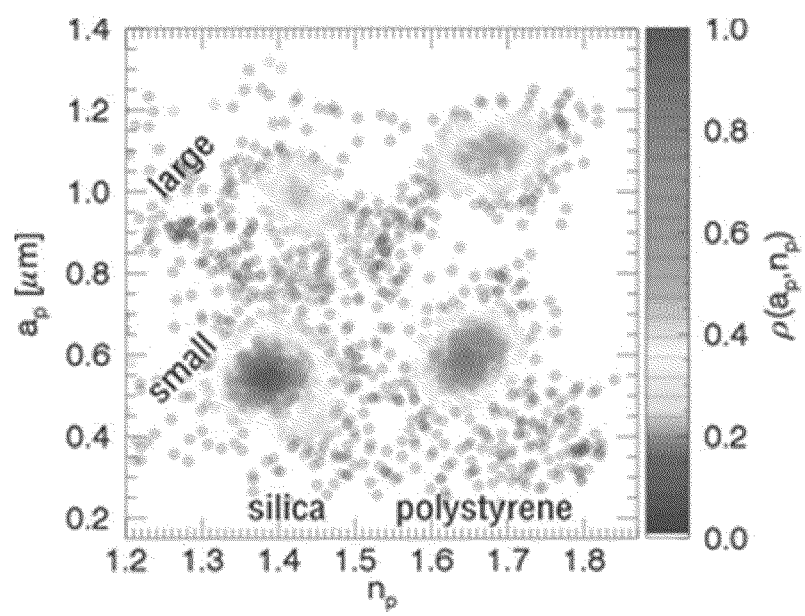
FIG. 1 Proof-of-concept colloidal finger-print. Measured radius $a_p$ and refractive index $n_p$ of 2,500 colloidal spheres from a four-component mixture, clearly resolving the multimodal distribution $\rho(a_p, n_p)$.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Colloidal fingerprinting relies on the unique capabilities of Spheryx's Total Holographic Characterization technology to measure the joint distribution of size and refractive index of the colloidal particles in a dispersion. The experimental data plotted in FIG. 1 constitute a proof of concept for colloidal fingerprinting. Each point in this plot represents the measured radius, $a_p$, and refractive index, $n_p$, of an individual colloidal sphere flowing in its fluid medium down a microfluidic channel. The ensemble of 2,500 such measurements plotted in FIG. 1 therefore constitutes a direct measurement of the joint distribution, $\rho(a_p, n_p)$ of the particle properties in the sample. The individual data points are colored by the local density of measurements to illustrate this point. This particular sample was deliberately constituted from a mixture of four monodisperse samples of colloidal spheres, two composed of silica and the other two of polystyrene. For each composition, spheres with nominal radii of 0.5 μm and 1 μm were mixed to create a 2×2 array of particle characteristics in the $(a_p, n_p)$ plane. This set of particle properties is clearly resolved in the experimentally recovered distribution plotted in FIG. 1. These data therefore constitute a fingerprint for the mixed dispersion, and thus a proof-of-concept for colloidal fingerprinting.

The presence or absence of peaks in the joint distribution can be used to encode information, such as the date and location of manufacture, a serial number, or an expiration date. The precise location and shape of each peak, furthermore, can be compared with initial characterization data to establish the authenticity of the fingerprint.

The data plotted in FIG. 1 were acquired and analyzed in under 10 min. Improvements in sample handling, data reduction and statistical analysis that are planned for this research program should reduce the measurement time for comparable samples by a factor of 4. The number of data points required for a complete analysis scales no faster than linearly with the number of bits of data to be encoded. A complete analysis of the 15-member fingerprints proposed here therefore should require no more than 10 minute, and could be substantially faster.

Total Holographic Characterization

Colloidal fingerprinting is made possible by the ability of Total Holographic Characterization to measure both the size and refractive index of individual colloidal particles. No other colloidal characterization technique would have been able to distinguish the four populations of particles by both size and composition. Analyzing size or refractive index separately would have yielded bimodal distributions in each case, and thus would have failed to reveal the four distinct populations in the dispersion.

Figure 2A:
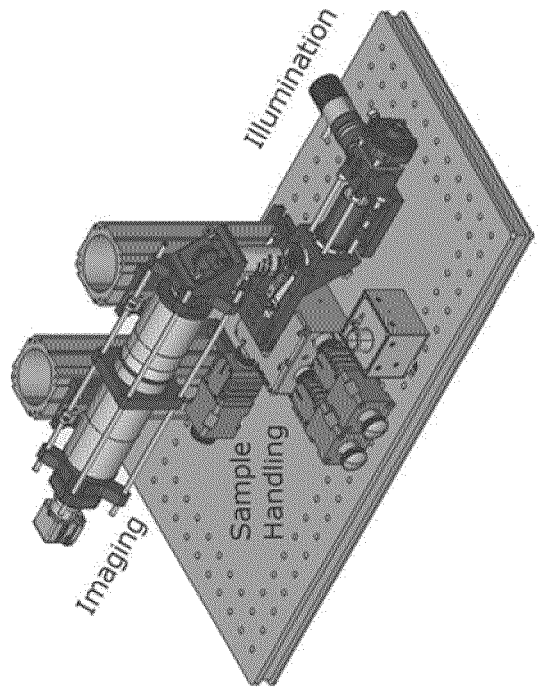
FIGS. 2A-B show Total Holographic Characterization.

The technique, illustrated in FIG. 2A, is based on recent advances in in-line holographic video microscopy that were pioneered by the Grier group at New York University. Light from a collimated laser beam illuminates a colloidal sample within a microfluidic channel. An illuminated particle scatters some of that light to the focal plane of a microscope, where it interferes with the remainder of the beam. The microscope magnifies the resulting interference pattern and projects it onto the sensor of a video camera, which records its intensity.

Each hologram in the resulting video stream contains comprehensive information about the scattering particle's size, shape, position and composition. The innovation in Total Holographic Characterization is in the method to extract that information. The recorded hologram may be modeled as the superposition of a plane wave linearly polarized along the $\hat{x}$ direction and the wave $f_s(kr)$ scattered by the particle:

$$b(r) = |\hat{x} + e^{ikz_p} f_s(k(r-r_p))|^2, \quad (1)$$

where $k=2\pi n_m/\lambda$ the wavenumber of light of wavelength $\lambda$ traveling through a medium of refractive index $n_m$, and where $r_p=(x_p, y_p, z_p)$ is the three-dimensional position of the particle relative to the center of the microscope's focal plane. The intensity distribution I(r) of a measured hologram can be compared with Eq. (1) if it is first corrected for the dark count of the camera $I_{dc}(r)$ and then normalized by the background intensity distribution $I_0(r)$.

$$b(r) \approx \frac{I(r) - I_{dc}r)}{I_0(r) - I_{dc}(r)} \quad (2)$$

This normalization also corrects for spurious interference fringes in the field of view due to dust and other imperfections.

The general form for $f_s(kr)$ is notoriously difficult to compute. If, however, colloidal fingerprints are composed of spherical particles, the scattering function $f_s(kr)$ is given in analytic form by the Lorenz-Mie theory of light scattering. A recorded hologram then may be fit to Eq. (1) for the particle's radius, $a_p$, refractive index, $n_p$, and three-dimensional position, $r_p$. Measurements on model systems confirm fit estimates of nanometer resolution in $r_p$ and part-per-thousand resolution in $a_p$ and $n_p$. Holographic microscopy, moreover, operates in situ with a time resolution limited by the exposure time and frame rate of the video camera. Unlike more conventional particle characterization technologies such as dynamic light scattering and Coulter counters, holographic characterization requires minimal calibration, relying only on knowledge of the laser wavelength, the refractive index of the supporting medium and the microscope's magnification.

Figure 2B:
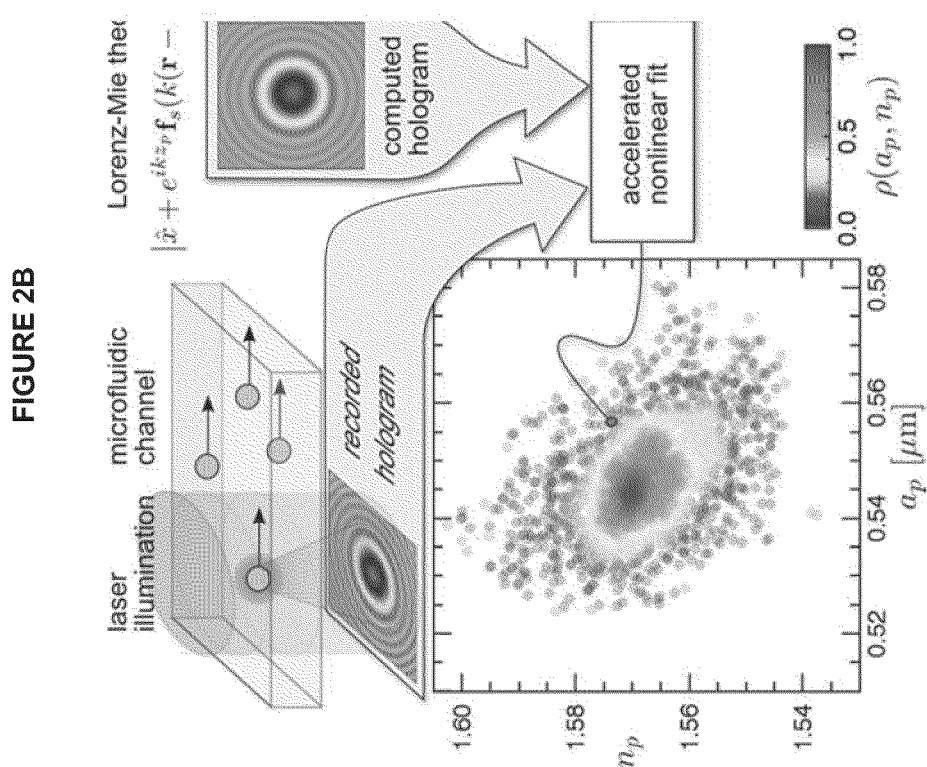

The data plotted in FIG. 2B illustrate how particle-by-particle measurements can be accumulated into a population distribution for the properties of a dispersion, in this case a sample of 1.1 μm diameter polystyrene spheres. Unlike conventional particle characterization techniques such as dynamic light scattering, Total Holographic Characterization does not require a model for the particle size distribution or estimates for the particles' refractive indexes. Rather, this information is obtained for each particle individually and can be combined into statistical samples so that population distributions can be discovered rather than being assumed. Even for a single-component system, this information provides valuable insights. The slight anticorrelation between particle size and refractive index evident in FIG. 2B, for example, is consistent with 1-2% porosity in the spheres, the pores being filled with water. The data in FIG. 1 were amassed in the same way and provide a clear impression of the mixture of particles that were blended into the sample.

Prophetic Examples

Embodiments of the colloidal fingerprinting will provide stable colloid mixtures suitable for use in a variety of fluid media, demonstrate binary and high-resolution data retrieval, and quantify uncertainties and error rates over the entire parameter space to provide useful fingerprinting data.

In a particular application, colloidal fingerprints can be embedded in commercial samples. The colloidal mixture should be configured to remain stable. In addition, colloidal fingerprint remain readable even if the sample itself contains colloidal particles, emulsion droplets, or contaminants. The distribution of particles in the sample should be characterized before introducing a colloidal fingerprint. Then the mixture of colloids is tailored in the fingerprint so that it still can easily be identified despite the confounding factors. This would be impossible for methods which average over the whole distribution. However, single particle resolution allows the colloidal fingerprint to be extracted even in a complex sample.

In one embodiment, the proposed program to develop colloidal fingerprinting requires the development and characterization of a library of chemically inert and physically stable colloidal spheres from which fingerprints will be constituted. One example of library synthesis and characterization is described below.

Samples drawn from the library will be combined at predetermined stoichiometries in featureless media such as water and corn oil and then analyzed with Total Holographic Characterization to confirm data retrieval. This analysis, an example of which is described below, will apply optimal statistical methods to minimize the time and sample volume required to extract the encoded information with confidence. In addition to determining which of the library members are present in a given fingerprint, high-resolution characterization can be used to detect attempts to spoof colloidal fingerprints, thereby contributing to product security and counterfeit detection. Finally, some products inherently consist of populations of colloidal particles with characteristic distributions of size and refractive index. Milk and dairy products are an example. These intrinsic fingerprints can be recorded at the point of manufacture and compared with fingerprints obtained from products in the field to obtain information on provenance without requiring additional labeling. Intrinsic colloidal fingerprinting is described below.

Fingerprint Library Development

An initial library will consist of 15 different populations of colloidal spheres in five clearly distinguishable sizes composed of three optically distinct materials. Candidate materials include colloidal silica (refractive index $n_p=1.41$ at the measurement wavelength of $\lambda=405$ nm) polymethymethacylate (PMMA) ($n_p=1.51$) and polystyrene ($n_p=1.62$). With this distribution of refractive indexes, monodisperse samples with diameters of 0.9 µm, 1.3 µm, 1.9 µm, 2.4 µm and 3 µm should be easily resolved by Total Holographic Characterization. These particles will be prepared and characterized, including by scanning scanning electron microscopy, dynamic light scattering and holographic characterization.

In one example, the use of custom-synthesized particles is warranted by the need for well-characterized particles with well-documented compositions. Commercially available colloidal spheres often are produced with proprietary syntheses and are packed with proprietary stabilizing agents that can interfere with subsequent functionalization.

The joint distribution of size and refractive index, measured at a specific wavelength, will serve as a template for recognizing each element of a fingerprint. The mean size, mean refractive index, variance in those values and their correlation all contribute to the recognition process. These quantities, moreover, constitute a high-resolution fingerprint of the individual components which can be useful for distinguishing manufacturers' original fingerprints from spoofed duplicates.

Ordinarily, Total Holographic Characterization yields the same radius and refractive index for a given type of particle regardless of the chemical composition of the supporting medium. This can be complicated if the medium swells the particles or if the particles are porous and imbibe the medium. Care will be taken during library synthesis to develop processing procedures to minimize porosity and to ensure that fingerprint particles' properties are consistent, at least within each of their intended application areas. This will be ascertained by Total Holographic Characterization of each library component in a variety of solvents including water, alcohols and oils. These measurements, in tandem with conventional porosimetry will help to ensure that colloidal fingerprints are reproducible and stable over time.

In applying colloidal fingerprints to real-world materials, particular care must be directed to preventing aggregation, flocculation or deposition, each of which can disrupt data retrieval, and could affect the properties of the medium. Steric stabilization with surface-grafted polymers or block copolymers will be tested as a general strategy, particularly for aqueous samples. Custom stabilization may be necessary for nonaqueous media and for samples containing depletants and other strongly interacting components. In all cases, library components will be characterized in situ and with stabilization in place to ensure consistent data retrieval.

Initial characterization data, typically resembling the results plotted in FIG. 2B, will be stored and compared with data obtained during fingerprint retrieval. Each synthesized batch of each library component will differ in subtle but measurable ways from other equivalent realizations. These differences can be small enough to ignore for routine data retrieval. Detailed comparisons with initial characterization data can be used to verify that a particular fingerprint is composed of authentic fingerprint particles. This constitutes an anti-counterfeiting measure directed against spoofed fingerprints.

Figure 3:
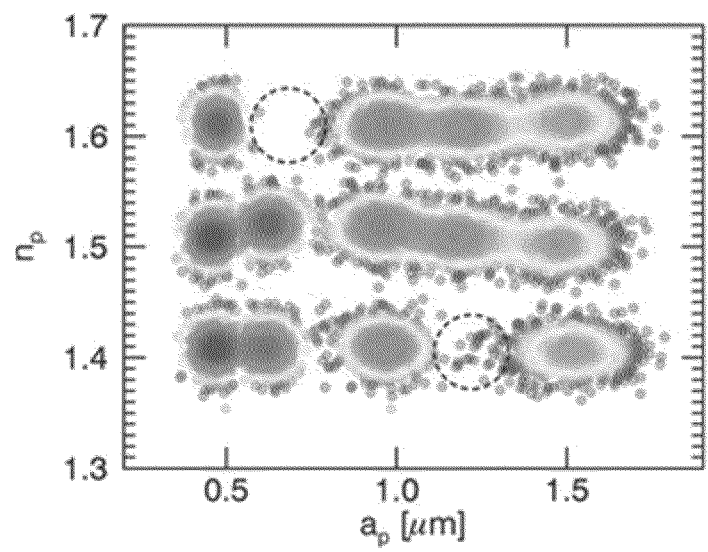
FIG. 3 Simulated colloidal fingerprint consisting of 10,000 points drawn from 13 populations of the proposed 15-member library. The widths of the distributions reflect an anticipated 8 percent variance in each population's radius and 0.01-unit variance in refractive index.

Once the library of particles is constituted and characterized, individual fingerprints can be created by mixing specific stoichiometries of the components into a blend that contains elements from one or more of the library's populations. FIG. 3 shows simulated data from a 13-member fingerprint, the two missing populations being indicated by dashed circles. The widths of the individual populations' distributions are set by the anticipated 8% variance of the radius with respect to the mean for each population. The range of refractive index variations is estimated to be 0.01 refractive index units by comparison with typical results for comparable samples. Deviations of the mean radii and refractive indexes from their planned values reflect typical results for colloidal synthesis. The radii and widths are treated as uncorrelated in the simulation because the particles prepared for fingerprinting are assumed not to be porous. The presence or absence of library elements constitutes the fingerprint encoded in a given mixture. This dispersion then is mixed into the product, thereby embedding the fingerprint in the product.

In one embodiment, the library is at least a fifteen-member library of colloidal particles for creating up to 32,767 distinct colloidal fingerprints. The populations will differ from each other in size and refractive index so that they can be identified unambiguously through Total Holographic Characterization.

Fingerprint Retrieval

Once a material/composition has been fingerprinted, or inherently has a colloidal fingerprint, the fingerprint must be "read" to provide identifying information. For example, physical and statistical methods for detecting and extracting colloidal fingerprint data from fluid samples can be utilized. Reading out the fingerprint encoded into a material requires reconstituting the fingerprint particles in a fluid medium that can flow down a microfluidic channel for holographic analysis. In some cases, this might require simple sonication. In others, the product may have to be diluted or otherwise chemically modified to minimize extraneous features. The wormlike micelles in shampoos, for example, can be eliminated by dilution. Perfume microcapsules in laundry detergent, by contrast, will remain in suspension, and will be analyzed in parallel with fingerprint particles.

It is contemplated that this stage of material processing may introduce sampling bias into the measured distribution of particle sizes and refractive indexes, such should be explored. Such biases might arise, for example, due to differential sedimentation, or due to flow fractionation in the microfluidic channel. Any such bias will be assessed, and mitigating protocols developed. For example, biases due to flow fractionation in the channel's Poiseuille flow profile can be minimized by reducing the length of the channel.

Any uncorrected sampling bias detected can be compensated by appropriately adjusting the stoichiometry of the fingerprint dispersions. Calibrating the fingerprinting process in this way should be necessary just once for each product, and then should work reliably thereafter.

Binary Readout

One embodiment involves applying methods of optimal statistics to establish the minimal conditions for reliable data retrieval from colloidal fingerprints, and verify these predictions experimentally. The simulated data in FIG. 3 illustrate how encoded data can be extracted from a dispersion. Each of the component populations in the mixture should be readily resolved, given sufficient statistics. The distribution in FIG. 3 consists of 10,000 simulated measurements of particle properties, which would require 10 min of data collection and analysis in the laboratory. The presence or absence of a given population constitutes one "bit" of fingerprint data. The two missing populations in FIG. 3, for example, might constitute zeros, and the 13 observed populations might constitute ones.

The presence of a population within the sample is established by observing a local peak in the joint distribution, $\rho(a_p, n_p)$, of particle size and refractive index at established points in the $(a_p, n_p)$, plane. The probability that a set of measurements, $s=\{(a_j, n_j)\}$ is consistent with the fingerprint indexed by k can be established with a multivariate Kolmogorov-Smirnov test. Membership of a particular measurement in one of the library populations similarly can be assessed with kernel density estimators. The combined single-measurement probabilities used to develop a statistical estimator for fingerprint detection.

The presence or absence of the n-th bit of data in a colloidal fingerprint may be treated as a binary value, $b_n^k$, which has the value 1 if particles drawn from the n-th member of the fingerprint library are expected to be present in the fingerprint labeled k, and is 0 otherwise. The data stored in the k-th fingerprint is therefore the set of bits $d^k = \{b_n^k\}$. Analyzing the data stream s involves deciding whether each single-particle measurement corresponds to one of the bits in a fingerprint, and then deciding which bits are present in the sample.

The probability that the j-th particle is associated with bit n is $$\rho_{jn} = \rho_n(a_j, n_j), \qquad (3)$$

where $\rho_n(a_p, n_p)$ is the previously calibrated joint distribution for particles in the n-th library element. Similarly, the probability that the particle is not drawn from bit n is $q_{jn} = 1 - \rho_{jn}$. These considerations provide a basis for detecting spurious particles that are not part of the library. The probability that particle j is not an element of the library is $$Q_j \prod_n q_n, \qquad (4)$$

and the complementary probability that it is part of a fingerprint is $P_j = 1 - Q_j$. This inclusion probability $P_j$ can be used to test whether an individual characterization measurement should be used to identify a fingerprint.

The probability that measurement j is not an element of the k-th fingerprint is $$\prod_n \left[ b_n^k q_{jn} + (1 - b_n^k) p_{jn} \right], \qquad (5)$$

Conversely, the probability that the particle sampled in the j-th measurement is a representative of the k-th fingerprint is $P_j^k = 1 - Q_j^k$. With these results, we can obtain the probability that the data stream s represents a measurement of fingerprint k:

$$P^k(s) = \prod_j P_j^k \qquad (6)$$

An equivalent result may be obtained from the negotiation, $$P^k(s) = \prod_j Q_j^k(s) \qquad (7)$$

The most probable fingerprint then would be identified as the fingerprint for the sample, k(s), and the corresponding data value, $d^k(s)$, would be recovered.

To ensure consistent results, one or two specifically chosen populations may be incorporated into every fingerprint. Their presence in the accumulated characterization data will help ensure that material processing and sample collection are proceeding correctly. The statistics of these fiducial marker populations also can be used to establish how much data must be acquired to extract data reliably.

Once the presence or absence of the individual populations is established, the encoded data can be reconstituted based on the meaning applied to the individual bits.

Secure Fingerprinting

In one embodiment, statistical tests detect counterfeit. The positions of individual bits in the $(a_p, n_p)$ plane are determined by the synthesis conditions for the library elements. Slight variations from batch to batch are inevitable, and each batch will have to be specifically calibrated by Total Holographic Characterization before it can be used for fingerprinting. These variations, therefore, can be used to distinguish batches, and thus to verify the authenticity of a fingerprint. More subtle features of a batch's distribution, such as the variance in radius and refractive index, similarly can be used to establish authenticity.

Reproducing any single sample's characteristic distribution of size and refractive index with enough precision to avoid detection would be difficult. Spoofing an entire fingerprint composed of several such samples would be all the more difficult and costly. Counterfeiting colloidal fingerprints therefore is unlikely to be successful, and certainly would be a costly and labor-intensive proposition.

Extracting a valid fingerprint from an authentic product and dividing it among counterfeit products similarly would be labor intensive. This process would yield comparatively few fraudulent fingerprints before dilution of the fingerprint particles would become apparent.

Detecting counterfeit fingerprints may be implemented by noting that the two expressions for $P^k(s)$ in Eqs. (6) and (7) should yield equivalent results. Discrepancies might indicate a departure from the assumptions underlying the derivation, particularly the assumption that the particle populations in data stream s were drawn from the same distributions that were used for the calibration data. In this case, the maximally likely fingerprint also will have a lower overall probability than would have been observed with a true fingerprint. Differences in the trial and calibration data can be further confirmed by plotting the distribution of values associated with particles that fail the fingerprint inclusion test from Eq. (4).

In one embodiment, a basic statistical analysis is used, but in further embodiments such should be considered a starting point for a more comprehensive Bayesian analysis. A complete analysis may include confidence levels for single-bit detection and for whole-pattern detection, and more sensitive tests for spoofing. It should be appreciated, that in such embodiments these metrics will help to establish how much data is required to extract data from a fingerprint with a specified level of confidence and security, and thus how much time is required to perform colloidal fingerprinting. The simulated data in FIG. 3 suggest that a sample of 10,000 particles should be more than enough for reliable detection, and thus that 10 min should be considered an upper bound on analysis time.

Intrinsic Fingerprints

Figure 4:
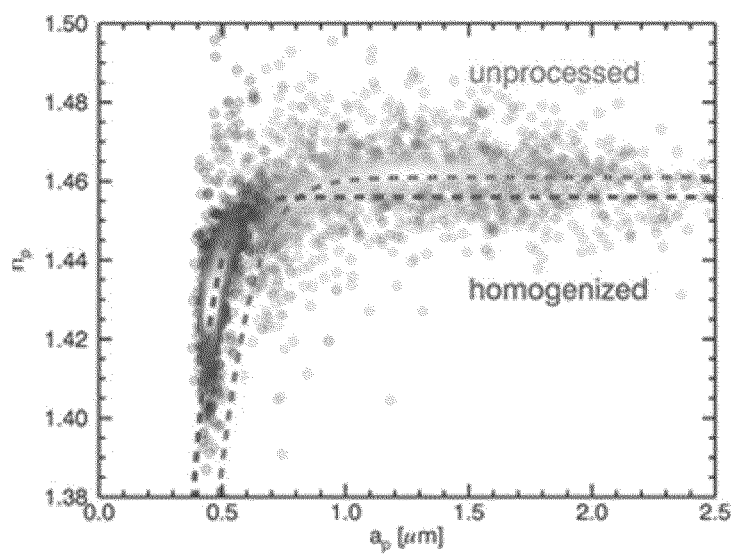
FIG. 4 Intrinsic fingerprints of milk. Data points reflect the radius and refractive index of individual milk fat globules obtained from samples of homogenized cows milk and unprocessed cows milk. Curves are fits to a model that in-corporates the influence of the milk-fat globule membrane on light scattering.

Fingerprint models for consumer products that inherently are composed of colloidal mixtures can be established in one embodiment. The holographic characterization data in FIG. 4 illustrate this concept. These were obtained for two samples of cows milk, one homogenized, and the other not. The two distributions are clearly distinguishable. Other products, such as sunscreen, laundry detergent and cosmetics also feature characteristic distributions of colloidal properties that can be calibrated. Samples of these products subsequently can be analyzed and compared with calibration data using the methods described below. Such intrinsic fingerprints might meet manufacturers' needs for traceability without requiring any colloidal additives.

Colloidal Particle Management

In one embodiment, a microfluidic autotitration system with imaging feedback to dilute colloidal samples for holographic analysis. The current implementation of Total Holographic Characterization works best for samples that are diluted to the point that spheres' holograms do not overlap in the field of view. Excessive dilution, however, reduces the rate at which particles pass through the observation volume and thus increases the time required to analyze a sample. The proposed automated system will continuously adjust the degree of dilution to minimize overlap between neighboring particles' holograms while maintaining a reasonable throughput of particles for rapid characterization.

Samples currently are diluted by technicians before being introduced into the holographic characterization system's microfluidic flow channel. The goal of this effort is to automate this process, thereby reducing the expense and time required to process a fingerprint.

It is believed several methods may be suitable in certain embodiments, ranging from commercial off-the-shelf fluidic autotitration systems to custom-designed microfluidic dilution systems. Feedback will be provided by image analysis of the sample flowing through the observation volume using industry-standard methods of particle tracking that originally were developed by the Grier lab. Among the most critical considerations for this development effort will be to ascertain that measured sample composition is not affected by the dilution process. This will be assayed by performing measurements on colloidal mixtures of the sort presented in FIG. 1 and verifying that the relative abundances of the different populations remain unchanged by automated processing. Particular care will be taken to treat surfaces appropriately to minimize deposition of particles, particularly in cases when differential deposition rates might affect measured results. These assays will be part of an overall characterization of the measurement system's selection bias based on size or composition of the sample particles.

As part of this effort, researchers from Spheryx will collaborate with the NYU Colloidal Synthesis Facility to develop libraries of colloidal particles that are stable when dispersed in a product and remain stable when processed for readout.

Fingerprinting with Magnetic Particles

Characterizing Non-Ideal Particles

In another embodiment, systems and analytical techniques are provided for colloidal fingerprinting that can accommodate non-ideal particles, particularly particles with magnetic inclusions. The initial implementation of colloidal fingerprinting will use specially synthesized colloidal spheres whose properties closely approximate the assumptions of Lorenz Mie theory. Specifically, these particles are spherical to within a fraction of a percent variation in the radius, have smooth surfaces, and have a homogeneous composition. Their holograms lend themselves to pixel-by-pixel analysis by nonlinear least-squares fitting to Eq. (1). Slight departures from ideality yield holograms that still can be fit to the ideal model, with the proviso that the resulting parameters may not reflect the actual properties of the particle. This poses problems for applications that rely on precise characterization. Colloidal fingerprinting, fortunately, does not rely on accuracy, but rather on precision. So long as the analytical procedure yields reproducible characterization data, the actual values are not important.

Larger departures can cause nonlinear fitting to fail altogether. Analyzing such particles either requires more sophisticated modeling, or else more robust analytical techniques.

The Grier group recently has demonstrated that methods of machine learning can yield meaningful estimates for single-particle characteristics without requiring nonlinear fitting. Preliminary results on dimpled spheres suggest that machine-learning estimates are robust against departures from sphericity. Numerical studies suggest that they may yield reproducible results for spheres with inclusions. Machine-learning algorithms are extremely computationally efficient, moreover, and thus can be useful for reducing the time needed to analyze fingerprints.

In one embodiment, machine-learning can be utilized with colloidal fingerprinting. These studies will start with head-to-head comparisons with nonlinear fits to assess precision, accuracy and reproducibility for homogeneous spherical particles. They then will move on to studies on fingerprints composed of inhomogeneous particles, particularly core-shell particles. Results of these studies will be compared with conventional analytical measurements using systems available in NYU's Colloidal Synthesis Facility and Shared Instrumentation Laboratory. These instruments include a Malvern Zetasizer Nano ZS, a Malvern Mastersizer S, a Coulter N4 Plus Submicron Particle Sizer and a Zeiss MERLIN field-emission scanning electron microscope.

Magnetic Fingerprint Particles

One embodiment utilizes machine-learning algorithms for analyzing core-shell spheres. Further specific embodiments may extend to colloidal fingerprints composed of colloidal particles with embedded magnetite cores. Incorporating magnetic cores into fingerprint particles will greatly facilitate separating a colloidal fingerprint from its host medium. Assuming the rest of the sample to be non-magnetic, the magnetite-loaded fingerprint particles can be collected with a simple magnet and then redispersed for analysis.

Double-Blind Testing

A double-blind study may be used to verify the accuracy with which colloidal fingerprints can be read out. Colloidal mixtures will be prepared delivered to with no identifying marks beyond a randomized serial number linked to the preparation logs. No party will know the composition of the individual fingerprints until the study is complete. Researchers will perform holographic characterization measurements on the individual library components and on the mixtures, and will report back to the preparers what library elements appear to be present in each of the mixtures. Test results then can be compared with preparation logs to establish the correctness of the holographic analysis. The double-blind analysis will be repeated as a function of number of particles sampled to verify the statistical limits for reliable read-out.

Figure 5:
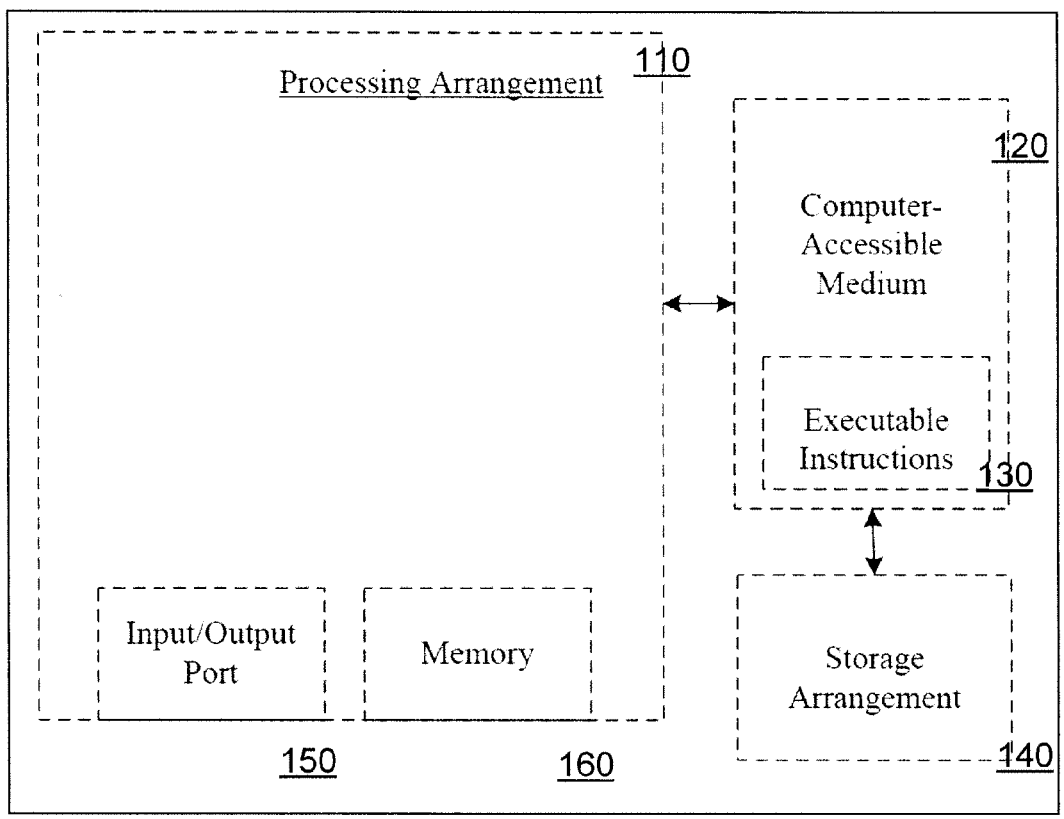
FIG. 5 illustrates a computer system for use with certain implementations.

As shown in FIG. 5, e.g., a computer-accessible medium 120 (e.g., as described herein, a storage device such as a hard disk, floppy disk, memory stick, CD-ROM, RAM, ROM, etc., or a collection thereof) can be provided (e.g., in communication with the processing arrangement 110). The computer-accessible medium 120 may be a non-transitory computer-accessible medium. The computer-accessible medium 120 can contain executable instructions 130 thereon. In addition or alternatively, a storage arrangement 140 can be provided separately from the computer-accessible medium 120, which can provide the instructions to the processing arrangement 110 so as to configure the processing arrangement to execute certain exemplary procedures, processes and methods, as described herein, for example.

System 100 may also include a display or output device, an input device such as a key-board, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. A method for identifying a colloidal fingerprint of a material, comprising:
    analyzing a sample of the material having a plurality of particles using holographic light microscopy;
    determining using holographic light microscopy a joint distribution of particle radius ($a_p$) and refractive index ($n_p$) for the plurality of particles in the sample;
    identifying a plurality of local peaks from the joint distribution;
    determining a particle fingerprint from the for each of the plurality of local peaks a based upon an associated particle radius and an associated particle refractive index;
    comparing particle fingerprint with a colloidal fingerprint library; and
    identifying the material based upon the comparison of the particle fingerprint to the colloidal finger print library.

2. The method of claim 1, wherein the sample size is at least 10,000 colloidal particles.

3. The method of claim 1, further comprising reconstituting the colloid in the fluid prior to analyzing.

4. The method of claim 1, further comprising applying a calibration to the determined priority to correct for sampling bias.

5. The method of claim 1, further comprising identifying the presence of one or more colloidal populations based upon the identified at least one peak.

6. The method of claim 1, further comprising identifying a colloidal fingerprint of the material.

7. The method of claim 6, wherein the identified colloidal fingerprint is the most probable fingerprint associated with the material.

8. The computer implemented machine of claim 7, further comprising comparing the identified most probable fingerprint with a fingerprint key.

9. The computer implemented machine of claim 7, further comprising identifying a plurality of bits of information encoded by the identified most probable fingerprint.

10. A computer-implemented machine for colloidal fingerprinting comprising:
    a processor;
    a holographic microscopy system;
    a sample stage for receiving and flowing a plurality of particles; and
    a tangible, non-transitory, computer-readable medium operatively connected to the processor and the holographic microscopy system and including computer instructions stored-therein for causing the processor to:
        analyze a portion of the plurality of particles using holographic light microscopy;
        determine, with the holographic light microscopy system, a joint distribution of at least two properties of the portion of the plurality of particles;
        identify at least one local peak from the determined joint distribution; and
        compare the identified at least one distribution peak with a fingerprint library.

11. The computer-implemented machine of claim 10, wherein the computer code configured to determine the at least one property comprises code to identify a joint distribution of particle radius (ap) and refractive index (np) and the determined distribution is a joint distribution.

12. The computer implemented machine of claim 10, wherein the material includes non-porous colloidal particles.

13. The computer implemented machine of claim 10, wherein the computer code is configured to identify the presence of one or more colloidal populations based upon the identified at least one distribution peak.

14. The computer implemented machine of claim 10 wherein the identified fingerprint is the most probable fingerprint associated with the colloid.

15. The computer implemented machine of claim 10, further comprising comparing the identified most probable fingerprint with a fingerprint key.

16. The computer implemented machine of claim 10, further comprising identifying a plurality of bits of information encoded by the identified most probable fingerprint.

17. The computer implemented machine of claim 10 wherein the computer code is configured to identify a fingerprint of the material.

18. A method for colloidal fingerprinting a material, comprising:
    analyzing a plurality of particles using holographic light microscopy;
    determining using holographic light microscopy a joint distribution of particle radius ($a_m$) and refractive index ($n_m$) for the material;
    adding a plurality of colloidal fingerprint populations, each with a known joint distribution of particle radius ($a_p$) and refractive index ($n_p$) and selected from a colloidal fingerprint library, to the material to create a fingerprinted material, the colloidal fingerprint library comprising a plurality of colloidal particles each having a unique, known joint distribution of particle radius and refractive index;
    wherein the fingerprinted material has a joint distribution of particle radius ($a_{mp}$) and refractive index ($n_{mp}$) based upon the material's determined joint distribution and the known joint distribution of the added plurality of colloidal firngerprint populations.

* * * * *